A. W. SWANSON.
PARKING DEVICE ATTACHMENT FOR AUTOMOBILES.
APPLICATION FILED JULY 15, 1920.
1,387,626.  Patented Aug. 16, 1921.
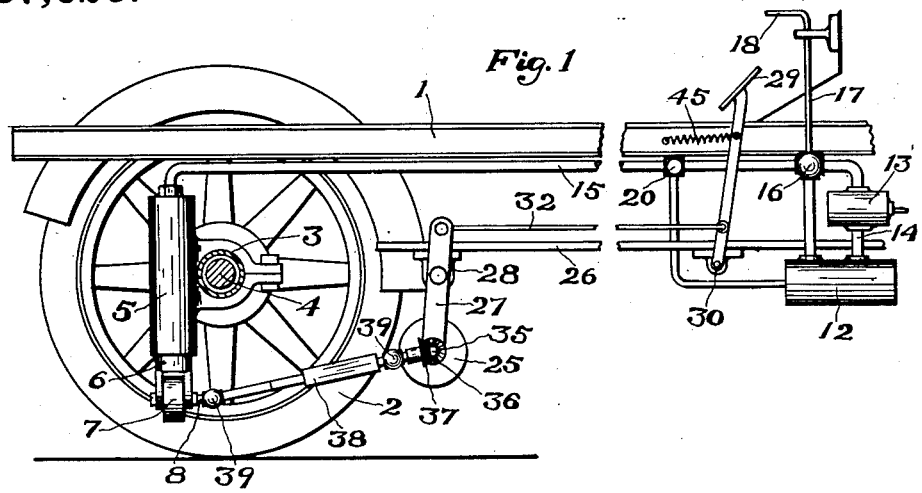
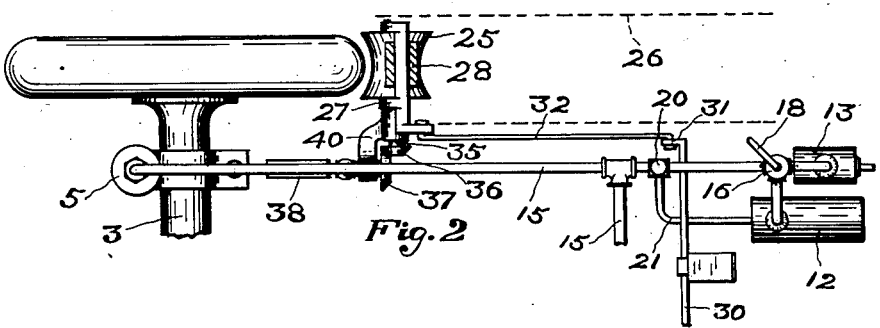
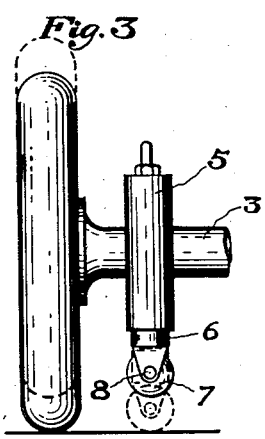
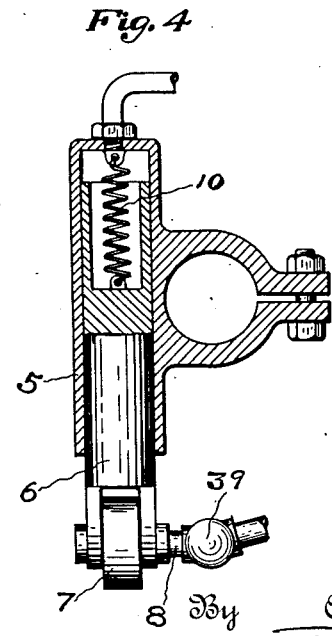
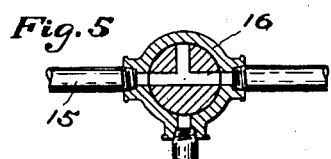
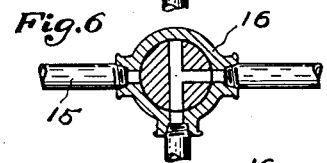
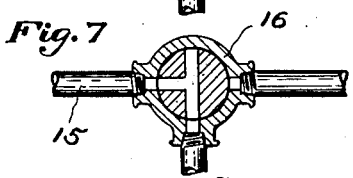
Inventor
Andrew W. Swanson
By Richard J. Cook
Attorney

UNITED STATES PATENT OFFICE.

ANDREW W. SWANSON, OF SEATTLE, WASHINGTON.

PARKING-DEVICE ATTACHMENT FOR AUTOMOBILES.

1,387,626.
Specification of Letters Patent. Patented Aug. 16, 1921.
Application filed July 15, 1920. Serial No. 396,396.

*To all whom it may concern:*

Be it known that I, ANDREW W. SWANSON, a citizen of the United States, and resident of Seattle, King county, Washington, have invented certain new and useful Improvements in Parking-Device Attachments for Automobiles, of which the following is a specification.

This invention relates to improvements in motor driven vehicles, and more particularly to means for assisting in parking vehicles, such as automobiles and trucks, where parking space is limited and where the vehicle is to be parked parallel with a curbing, or walk.

Automobile operators, or drivers, often find that it is desirable, and in some cases necessary due to traffic regulations, to park their vehicles parallel with curbings, or walks, but, where parking space is limited and vehicles are placed close together it is difficult to properly position a vehicle without considerable trouble. It is therefore the object of this invention to provide means whereby a vehicle can be moved laterally, with respect to its usual direction of travel, and in this way make parallel parking in close quarters or in limited space easy.

It is also an object of the invention to provide parking mechanism of the above character that can be associated with or installed on a vehicle, without alteration in the construction of the latter, and which is easily operated and controlled by one at the driver's position in the vehicle.

In accomplishing these and other objects of the invention, I have provided the improved details of construction, the preferred forms of which are illustrated in the accompanying, drawings wherein—

Figure 1 is a longitudinal, sectional view of an automobile equipped with parking mechanism constructed and mounted according to the present invention.

Fig. 2 is an under side plan view of the same.

Fig. 3 is a rear view of one of the vehicle wheels, a part of the axle housing, and a hoisting jack.

Fig. 4 is an enlarged, detail view, partly in section, of one of the hoisting jacks and rollers.

Figs. 5, 6 and 7 are detail views of the control valve in different position.

Referring more in detail to the several views of the drawings, wherein like reference numerals designate the same or like parts—1 designates the frame portion of a motor vehicle, which may be of the usual type of construction, having rear wheels 2 mounted at the outer ends of an axle housing 3 which incloses the usual driving axle 4.

Mounted fixedly on the axle housing, adjacent the wheels, or spaced apart a suitable distance, are vertically extending, cylinders 5, provided with extendible jacking pistons 6, which are adapted to be actuated downwardly from the cylinders, and which at their lower ends are equipped with rollers 7 that are fixed on axles 8 extended horizontally, and at right angles to the direction of the axle 4.

The pistons 6 are normally held in retracted position by the use of coiled springs 10, Fig. 4, located within the cylinders and which are secured at their opposite ends to the upper end of the cylinder and pistons, so that, when the mechanism is not in use the rollers and pistons are held at a substantial distance above the ground, but may be extended downwardly, by the forcing of a pressure medium into the cylinders at the upper ends, as is presently described, to cause the vehicle wheels to be lifted from the ground and the weight of the vehicle supported by the rollers 7.

The fluid pressure medium used for actuating the pistons, may be confined in a storage tank as shown at 12. A force pump 13 which may be driven in any suitable manner by electricity, or by the motor of the engine, is connected with the tank by a conduit 14 and with the cylinders by conduits 15, in such manner that, on starting the pump, the pressure fluid will be forced into the upper ends of the cylinders to actuate the pistons downwardly, to hoist the vehicle clear of the ground and support the same on the rollers 7.

A three way control valve 16 is placed in the main conduit 15, which is controlled by a rod 17 extended upwardly from the valve and provided with an actuating lever or handle 18 adjacent the driver's position.

This valve may be turned as shown in Fig. 5 to permit a direct flow of the pressure fluid into the cylinders, and, when the pistons have been extended to functional position, may be turned to position as in Fig. 6 to hold the pressure in the cylinders during the parking operation. When it is desired to lower the vehicle after parking, the valve may be turned to position as in Fig. 7 which permits the cylinders to drain back through the valve and a conduit 19 leading therefrom into the supply tank.

I have also provided the conduit 15 with a high pressure relief valve 20 which is placed between the pump and valve 16 and is connected by a conduit 21 with the supply tank. This valve operates to permit a discharge into the tank, should the pump be left in operation after the pistons have reached their outer limit of travel.

After the vehicle wheels have been raised from the ground by the extending of the pistons, the vehicle is moved laterally by revolving the rollers 7. This is accomplished by means of driving mechanism consisting of a pair of friction rollers 25 which are mounted on the under sides of the running boards 26 of the vehicle. These rollers are swingingly suspended by hanger members 27 which are pivotally mounted in brackets 28 fixed to the running boards, and may be moved into or from frictional driving contact with the wheels 2 by means of a foot lever 29, which is fixed on a revoluble cross rod 30 mounted on the vehicle frame adjacent the driver's position, and which latter has crank arms 31 connected by rods 32, with the hangers in such manner that forward pressure on the lever will move the latter to actuate the rollers against the wheels.

Each roller has an extended axle 35, and these are equipped with bevel gear wheels 36, that operate in mesh with like gears 37 on the upper ends of telescoping drive shafts 38, which at their opposite, or lower ends, are connected through universal joints 39 with the axles 8 of the rollers 7. The upper ends of the shafts 38 are carried in brackets 40 that are mounted on the extended axles, or driving shafts of the friction rollers.

The friction rollers are moved to non-functional position when the foot lever is released, by means of a spring 45 that is fixed to the floor of the vehicle and to the lever as shown in Fig. 1.

In using the device, for parking an automobile, after the front end of the vehicle has been driven into position, the control valve 16 is moved to open position as in Fig. 5, and the pump started to force the pressure medium into the cylinders which actuates the pistons downwardly to raise the vehicle and support the same from the rollers 7.

The valve is then turned to closed position, as in Fig. 6, to hold the pistons extended and the pump is turned off. The foot lever 29 is then moved forwardly to move the friction rollers 25 against the vehicle wheels, and operation of the latter will then drive the rollers 7 to move the car in a lateral direction.

When the car has been thus moved into proper position, the foot pedal is released and the spring 45 moves the friction rollers to non-functional position. The valve 16 is then opened, as in Fig. 7 and the pressure medium will drain from the cylinders back into the tank, and the springs 10 move the parts to raised position.

Having thus described my invention, what I claim as new therein and desire to secure by Letters Patent is—

1. The combination with an axle of a motor driven wheeled vehicle of the class described, of downwardly extendible jacks mounted on said axle adjacent the driving wheels thereof, rollers mounted at the lower ends of said jacks with their axes horizontal, and at right angles to the said axle, means for actuating the jacks downwardly to raise and support the vehicle on said rollers, driving means operable by engaging the same with the driving wheels of the vehicle when the latter are in non-supporting position for revolving the rollers to move the vehicle in a lateral direction.

2. In a wheeled vehicle of the class described, in combination with a vehicle axle, cylinders mounted on said axle adjacent its opposite ends, pistons mounted in said cylinders and extendible downwardly therefrom, rollers mounted at lower ends of said pistons, means for forcing a pressure medium into said cylinders to actuate the pistons outwardly to raise and support the vehicle on said rollers, hangers pivotally fixed to the vehicle frame, friction rollers mounted on said hangers movable into engagement with the driving wheels of the vehicle, telescoping shaft sections operatively connecting said friction wheels with said rollers whereby operation of the former will actuate the rollers to move the vehicle in a lateral direction, lever mechanism operable to move the hangers to cause the friction rollers to engage or disengage the driving wheels, and means for controlling the admittance of the pressure medium into and from the cylinders.

Signed at Seattle, Washington, this 2d day of July, 1920.

ANDREW W. SWANSON.